Patented May 12, 1936

2,040,661

UNITED STATES PATENT OFFICE 2,040,661

METHOD OF IMPROVING AND AGING DISTILLED ALCOHOLIC BEVERAGES

Alfred J. Liebmann, New York, N. Y.

No Drawing. Application February 19, 1934, Serial No. 711,991

2 Claims. (Cl. 202—78)

My invention relates to a new and improved method of improving alcoholic beverages. My invention relates particularly to the improvement of distilled beverages, although it generally applies to all types of alcoholic beverages.

One of the objects of my invention is to provide an improved method for artificially and rapidly aging distilled alcoholic beverages, such as whiskey, rum and the like so as to remove or change certain objectional ingredients of the raw spirit, without oxidizing the ethyl alcohol, and without substantially changing some of the desirable congeners of the raw spirit, so that the congeners which give the desirable taste and aroma to the beverage, are retained.

Another object of my invention is to utilize hydrogen peroxide under suitable conditions so as to selectively oxidize some of the objectionable ingredients of raw spirit, without oxidizing other and desirable ingredients of the raw spirit.

While I prefer to use hydrogen peroxide, I can use other substances, liquid and non-liquid, which can be decomposed so as to yield nascent oxygen or to yield an ingredient which exerts an oxidizing action.

Other objects of my invention will be set forth in the following description which illustrates a preferred embodiment, it being understood that the above general statement of the objects of my invention is intended merely to generally explain the same and not to limit it in any manner.

This application is a continuation in part of my application Ser. No. 640,336 which was filed in the United States Patent Office on October 29, 1932.

When whiskey or rum is produced by distillation, the fresh or raw whiskey has an objectionable odor and taste. For example a freshly distilled Bourbon whiskey has a characteristic or so-called slop odor so that raw or young whiskey is unpalatable.

After the whiskey is aged for several months, the slop odor is lost, but the whiskey is very thin and it has a light body. Likewise, freshly distilled or young rum has an objectionable flavor and odor. The objectionable flavor and odor of freshly distilled whiskey, rum and the like, are due largely to the presence of certain components of the so-called fusel oil. However the fusel oil contains numerous ingredients which are desirable for imparting flavor and aroma to the beverage, and whiskey which has been naturally aged contains a considerable percentage of some of the components of the so-called fusel oil. If the fusel oil is entirely destroyed, the beverage loses certain aromatic properties, and it is of inferior quality.

Likewise, and in addition to the ingredients which are commonly referred to under the general term of "fusel oil", freshly distilled whiskey has certain additional congeners.

Amongst the desirable congeners which should be preserved, and which are not generally included by the term "fusel oil", I refer to furfural, certain aldehydes, esters, and the like.

The objectionable ingredients are mainly certain higher alcohols and these objectionable ingredients vary with the raw material which is used for making the alcoholic beverage.

However the invention relates generally to all types of whiskies, including rye whiskey, corn whiskey, and it also relates to rum and distilled alcoholic beverages in general.

I have discovered that when hydrogen peroxide is intermixed with the raw whiskey or rum, and the hydrogen peroxide is permitted to decompose under suitable conditions, so as to yield nascent oxygen under suitable conditions, a selective oxidation is produced whereby the undesirable constituents of the raw whiskey are destroyed or altered so as to become unobjectionable, and without destroying those ingredients of the raw whiskey which impart the desired flavor and aroma. If hydrogen peroxide is added to the raw whiskey, the hydrogen peroxide is decomposed so as to yield nascent oxygen, but if the oxidation is carried out under ordinary atmospheric pressure, no favorable result is secured because the nascent oxygen escapes without exerting the desired oxidizing action.

However, if a suitable perssure is maintained during or throughout the oxidation, an improved beverage is rapidly produced, which approximates a naturally aged whiskey. For example, about 0.4% of commercial hydrogen peroxide can be added to a batch of freshly distilled Bourbon whiskey, said proportion being by volume. The mixture can be heated to a temperature of about 74° C., in a closed autoclave, while maintaining a pressure of 12 lbs. per square inch above normal atmospheric pressure, so that the absolute or total pressure within the auto-clave is maintained at about 26 lbs. per square inch. This treatment can be continued for about three hours. This treatment can also be applied to a young whiskey, about three months old, and which still has the objectional slop odor.

As the result of this treatment, the general character of the whiskey, particularly as to flavor and rum, is similar to whiskey which has been naturally aged for about two to three years.

If Bourbon whiskey or other whiskey is naturally aged for about six months, it loses the said slop odor but this whiskey is still very thin and it has a light body.

The above treatment can be applied to a whiskey which has been sufficiently aged so as to eliminate the slop odor, and the treatment materially improves the flavor and the aroma of the whiskey.

The hydrogen peroxide which is utilized is the ordinary 30% commercial product. The same treatment can be utilized for artificially aging rum, which has about 50% of ethyl alcohol.

In treating whiskey or rum, the commercial hydrogen peroxide can be added in a proportion of about .05 (five hundredths) to .10 (ten hundredths) cc. to 100 cc. of rum. By using a relatively small proportion of hydrogen peroxide, the process or processes which are later described herein can be carried out, without any danger of oxidizing either the ethyl alcohol, or of oxidizing the substances which produce the desired flavor and aroma.

In carrying out this process, the hydrogen peroxide can be intermixed with the whiskey or rum, at an ordinary room temperature of about 21° C., and at normal atmospheric pressure. The mixture is then run into an autoclave whose walls may be made of any suitable material, such as glass or the like, which does not react with the beverage. The temperature is then gradually raised by any suitable source of heat (either external or internal) and the above mentioned conditions of pressure may be maintained.

The pressure can be secured by pumping air into the autoclave, while the contents are at ordinary room temperature of about 21° C., and the batch is then heated to the required temperature.

I do not wish to be limited to the pressure above mentioned. Said pressure may be increased, as for example to a total or absolute pressure of two to three atmospheres and even higher. Likewise the pressure may be materially lower than in the specific example above mentioned.

I have found that the desired reaction begins when a Bourbon whiskey is intermixed with hydrogen peroxide, and the temperature is then raised to about 60° C. while maintaining a pressure in the autoclave or other closed vessel, which is as low as one pound per square inch above atmospheric pressure.

By using a relatively small percentage of hydrogen peroxide, and utilizing proper temperature and pressure conditions, the undesirable ingredients of the young whiskey or the like, are either destroyed or altered so as to render them unobjectionable, without destroying the desirable constituents of the young whiskey or the like, and without oxidizing the ethyl alcohol.

Whenever I refer to hydrogen peroxide either in the description or in the claims, I desire to include any substance which can decompose so as to yield oxygen or other oxidizing gas.

I have shown a preferred embodiment of my invention, but it is clear that numerous changes and omissions can be made without departing from its spirit.

Likewise, while I have given certain definite examples in order to explain the invention, there may be substantial variation from the pressures and/or temperatures above mentioned, without departing from the spirit of the invention.

I claim:

1. A method of improving and aging a distilled alcoholic beverage which contains ethyl alcohol and an additional ingredient which is more readily oxidized than the ethyl alcohol, which comprises causing hydrogen peroxide to decompose in said beverage so as to produce nascent oxygen, and subjecting the beverage to the action of said nascent oxygen so as to oxidize said ingredient and without substantially oxidizing the ethyl alcohol, said beverage being subjected to a pressure of at least substantially two atmospheres above normal atmospheric pressure throughout said oxidation.

2. A method of improving and aging a distilled alcoholic beverage which contains ethyl alcohol and an additional ingredient which is more readily oxidized than the ethyl alcohol, which comprises causing hydrogen peroxide to decompose in said beverage so as to produce nascent oxygen, and subjecting the beverage to the action of said nascent oxygen so as to oxidize said ingredient and without substantially oxidizing the ethyl alcohol, said beverage being subjected to a pressure of at least substantially two atmospheres throughout said oxidation and while said beverage is maintained at a temperature of at least substantially 60° C.

ALFRED J. LIEBMANN.